US009313551B2

(12) United States Patent
Funk et al.

(10) Patent No.: US 9,313,551 B2
(45) Date of Patent: Apr. 12, 2016

(54) ENHANCED PROGRAM GUIDE

(71) Applicant: Google Inc., Mountain View, CA (US)

(72) Inventors: Gregory Allan Funk, San Francisco, CA (US); Przemek Drochomirecki, Krakow (PL); Grzegorz Glowaty, Krakow (PL); Jacek Jakub Surazski, Krakow (PL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/919,736

(22) Filed: Jun. 17, 2013

(65) Prior Publication Data

US 2014/0373063 A1     Dec. 18, 2014

(51) Int. Cl.
| | |
|---|---|
| *G06F 3/00* | (2006.01) |
| *G06F 13/00* | (2006.01) |
| *H04N 5/445* | (2011.01) |
| *H04N 7/173* | (2011.01) |
| *H04N 21/482* | (2011.01) |
| *H04N 21/45* | (2011.01) |
| *H04N 21/466* | (2011.01) |

(52) U.S. Cl.
CPC ....... *H04N 21/4826* (2013.01); *H04N 21/4532* (2013.01); *H04N 21/4667* (2013.01); *H04N 21/4668* (2013.01)

(58) Field of Classification Search
CPC .......... H04N 5/44543; H04N 21/4312; H04N 21/4314; H04N 21/4821; H04N 21/4858; H04N 21/4532; H04N 21/4667; H04N 21/4668; H04N 21/4826; H04N 21/25435; H04N 21/25866; H04N 21/4334; H04N 21/44222; H04N 21/47211; H04N 21/482; H04N 21/6582; H04N 7/163; H04N 7/17318; H04N 7/17336

USPC ...................................................... 725/45–48
See application file for complete search history.

(56) References Cited

U.S. PATENT DOCUMENTS

| | | | |
|---|---|---|---|
| 6,483,548 B1 * | 11/2002 | Allport | ........................ 348/564 |
| 7,627,882 B2 | 12/2009 | Finseth et al. | |
| 7,644,427 B1 | 1/2010 | Horvitz et al. | |
| 7,657,907 B2 | 2/2010 | Fennan et al. | |

(Continued)

FOREIGN PATENT DOCUMENTS

| | | |
|---|---|---|
| EP | 1608175 | 12/2005 |
| WO | WO 0247387 | 6/2002 |

(Continued)

OTHER PUBLICATIONS

"TiVo," Wikipedia, http://en.wikipedia.org/wiki/TiVo, 12 pages, Last accessed Jun. 18, 2013.

(Continued)

*Primary Examiner* — Hai V Tran
*Assistant Examiner* — Jen-Shi Huang
(74) *Attorney, Agent, or Firm* — Byrne Poh LLP

(57) ABSTRACT

Systems and methods described herein relate to an enhanced program guide for programs that are broadcast according to a defined schedule. Program titles included in the guide can be ordered based on a relevance rank or score, potentially with no other parameter employed in determining a position of a program title within the guide. Presentation of the guide can be independent of a time axis or dimension and a channel axis or dimension. Titles can be displayed in a manner that is independent of a start time or running length of the associated program.

18 Claims, 10 Drawing Sheets

(56) References Cited

U.S. PATENT DOCUMENTS

| | | | |
|---|---|---|---|
| 7,721,311 B2 | 5/2010 | Kowald et al. | |
| 8,275,764 B2 | 9/2012 | Jeon et al. | |
| 2004/0098744 A1 | 5/2004 | Gutta | |
| 2004/0128690 A1* | 7/2004 | Zohar Ariely | 725/86 |
| 2005/0273815 A1* | 12/2005 | Orr et al. | 725/45 |
| 2006/0271955 A1* | 11/2006 | Saito et al. | 725/45 |
| 2009/0055385 A1* | 2/2009 | Jeon et al. | 707/5 |
| 2010/0070871 A1* | 3/2010 | Liesche et al. | 715/744 |
| 2010/0211636 A1 | 8/2010 | Starkenburg et al. | |
| 2011/0296463 A1* | 12/2011 | Suslov | 725/44 |
| 2012/0054278 A1* | 3/2012 | Taleb et al. | 709/204 |
| 2013/0046753 A1* | 2/2013 | Bowers et al. | 707/722 |
| 2013/0132378 A1* | 5/2013 | Gilad-Bachrach et al. | 707/723 |
| 2013/0204857 A1* | 8/2013 | Kartoun | 707/706 |

FOREIGN PATENT DOCUMENTS

| | | |
|---|---|---|
| WO | WO 2004034703 | 4/2004 |
| WO | WO 2004091187 | 10/2004 |

OTHER PUBLICATIONS

"Discovery & Suggestions," TiVo, http://www.tivo.com/products/tivo-walkthrough/suggestions/index.html, 2 pages, Last accessed Jun. 18, 2013.

"Samsung F8000 Smart LED TV & S9 UHD 4K TV—New Samsung Smart Tv," Samsung, http://www.samsung.com/uk/promotions/unveilces/, 2 pages, Last accessed Jun. 18, 2013.

Samsungusatube, "S Recommendation with Voice Interaction—Samsung CES 2013 Press Conference," Jan. 7, 2013, YouTube, https://www.youtube.com/watch?v=07iBXCgMwwA, Last accessed Jun. 18, 2013.

Pfeiffer, E., "'It's almost human,' Samsung unveils new smart TV and other gadgets at CES," Yahoo! News, Jan. 7, 2013, http://news.yahoo.com/%E2%80%98it%E2%80%99s-almost-human-%E2%80%99-samsung-unveils-new-smart-tv-and-other-gadgets-at-ces-234104842.html, 2 pages, Last accessed Jun. 18, 2013.

International Search Report dated Sep. 16, 2014 in International Patent Application PCT/US2014/042786.

Written Opinion of the International Search Authority dated Sep. 16, 2014 in International Patent Application PCT/US2014/042786.

* cited by examiner

ENHANCED PROGRAM GUIDE

TECHNICAL FIELD

This disclosure generally relates to an enhanced program guide for programs aired or broadcast according to a defined schedule.

BACKGROUND

Historically, television program guides were displayed as a two-dimensional grid, with a station/channel dimension (usually the y-axis) and a time dimension (usually the x-axis). For example, traditional guides lay out content with rows that include a set of sequentially numbered broadcast or cable channels with content that spans the time dimension columns such as now, 30 min from now, 60 min from now, etc.

In recent years, certain improvements have been set forth. For example, it has been recognized that channel information is not particularly important because such merely represents the source of the broadcast content. In fact, most users are more interested in the actual broadcast content or other information about the content rather than the source of that content. Accordingly, some program guides arrange program content in a two-dimensional grid with a time dimension (again, usually the x-axis), but with various different information provided according to the y-axis, such as genre.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems disclosed herein relate to an enhanced program guide for programs broadcast according to a defined schedule. A data component can be configured to receive program schedule data for a set of channels. The program schedule data can include a title of a program broadcast on a channel from the set of channels and a time associated with the broadcast of the program. An analysis component can be configured to determine a relevance rank associated with the program. A guide component can be configured to select the title for inclusion in the program guide based on the relevance rank. The guide component can further determine a position within the program guide for the title based on the relevance rank.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
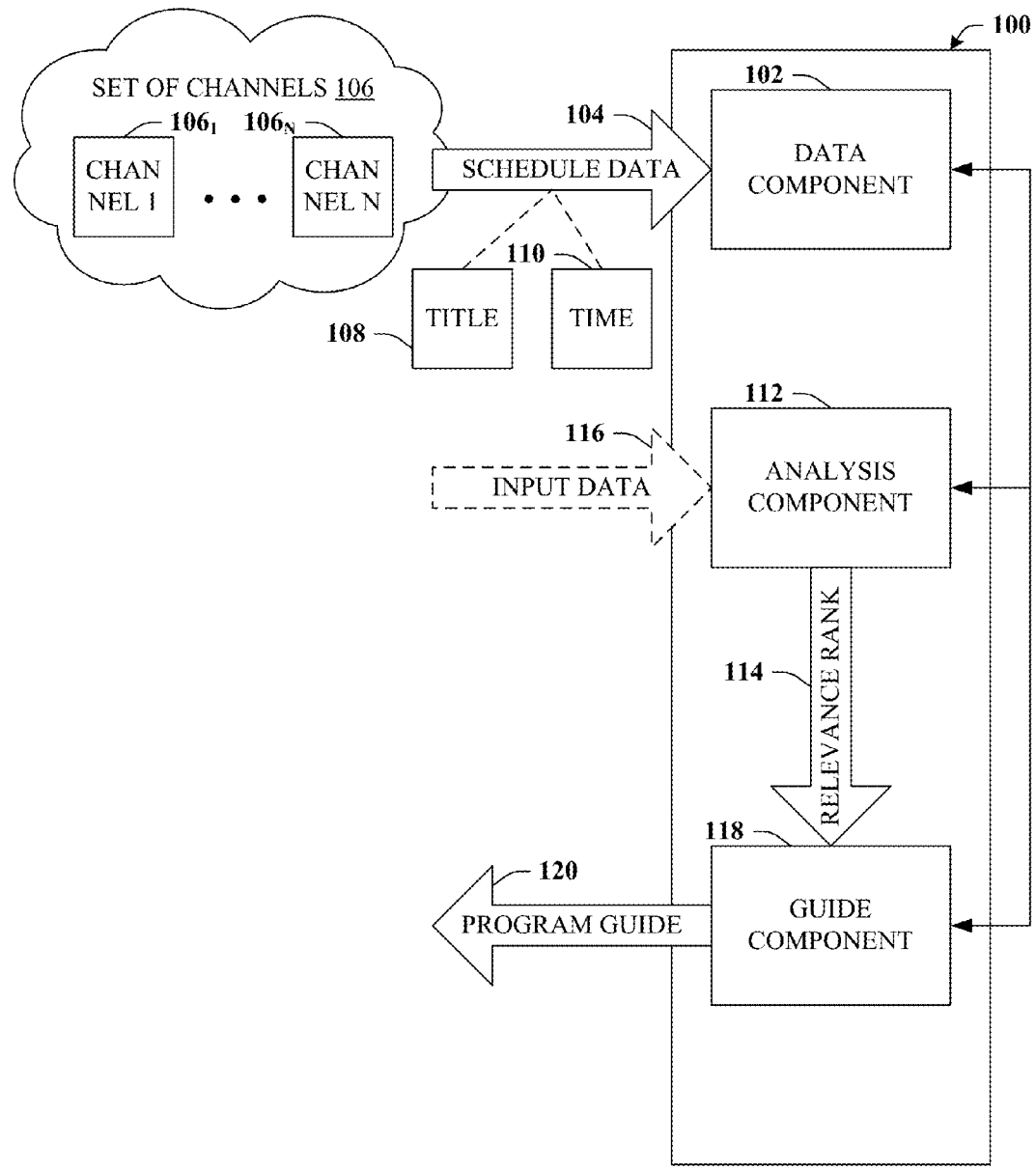
FIG. 1 illustrates a block diagram of an example system that can create an enhanced program guide that can be presented independently of a channel axis and a time axis in accordance with certain embodiments of this disclosure.

As noted in the background section, traditional program guides arrange information included in the guide in a two-dimensional grid. Typically, one axis of the grid relates to a channel identifier, genre, or some other category and the other axis relates to time. Such an arrangement is adequate, but can be improved and/or simplified. For example, in cases where channel number is used, such forces users to memorize channel numbers, channel blocks, or channel names and/or relative locations. Such also means that all visible content sourced from a given channel has to be shown at once and cannot be distributed across the guide based on its relevance or importance. In addition, to be useful and memorable to an individual content consumer and so that such channel numbers can be displayed and reused across other content consumers, channels must be arranged in a single fixed numerical sequence for an entire broadcast area and for all subsets of channels to which any one content consumer may subscribe. Given these constraints there is little hope of creating a reasonable and compelling channel order for any single content consumer. Dissimilar channels inevitably are placed next to one another. Moreover, even in cases in which a channel identifier is not used, programs that are underway or nearly complete might have the same weight within the guide as ones that are starting or about to start. Such makes it difficult to focus the user on better choices based on time remaining for content. For instance a two-hour movie that has 30 minutes remaining is given equal weight as a 30 minute program starting right now, which is an illogical outcome given content consumers are not likely to be interested in a movie that is almost over, but are much more likely to be interested in a program presently starting. In fact, consider the case in which a two-hour movie has one hour remaining. The movie is well underway, and therefore not likely to be of interest to most content consumers. On the other hand, a 30-minute program starting now is much more likely to be of interest. Even so, the movie listing is presented with twice the screen real estate as the 30-minute program, and therefore is visually given much more weight, even though there is very little probability that the movie can be of more interest to content consumers than the 30-minute program. Therefore, use of a time axis can be unnecessarily complex and even counterintuitive or counterproductive.

Most traditional guides also lack personalization and present the same content to every user. If a user has demonstrated a preference for certain programs, genres, categories, etc. based on past behavior such generally is not reflected by a channel guide. In particular, users typically are not directed to the best choices given revealed preferences. Further, traditional guides also typically lack any ranking of content.

Subject matter disclosed herein relates to an enhanced program guide that can be at once more useful and efficient as well as simpler, more intuitive, and/or more convenient than other guides. For example, the enhanced program guide can dispense with the traditional channel-by-time grid in connection with live television broadcasts or other suitable content. Instead, the programming content being broadcast or scheduled to be broadcast from multiple channels can be arranged according to a relevance score/ranking for the programs included in the guide. It is noted that while a time of broadcast (or even a source channel) can be a factor in determining the relevance score, the presentation of the guide can be independent of traditional layout axes, namely channel and time.

Program titles can be presented as an ordered list and in some implementations the list is based solely on the relevance score, typically those titles with higher relevance scores listed first and in order. Shelves or cells of the guide can be populated with titles based on one or more filtered query. The filter(s) can include genre, category, quality (e.g., high-definition, standard definition, etc.), time remaining, preferences or parameters tailored to a particular user (or user profile), real-time popularity (e.g., a large or trending audience tuning in right now), daypart factors and so forth.

Example Program Guide

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

It is to be appreciated that in accordance with one or more implementations described in this disclosure, users can opt-out of providing personal information, demographic information, location information, proprietary information, sensitive information, machine information, or the like in connection with data gathering aspects. Moreover, one or more implementations described herein can provide for anonymizing collected, received, or transmitted data.

Referring now to FIG. 1, a system 100 is depicted. System 100 can, inter alia, create an enhanced program guide that can be presented independently of a channel axis and a time axis. Embodiments disclosed herein can, for example, mitigate various issues associated with other guides, such as those issues detailed herein that arise due to tying the presentation of the guide to a channel axis or a time axis. System 100 can include a memory that stores computer executable components and a processor that executes computer executable components stored in the memory, examples of which can be found with reference to FIG. 9. It is to be appreciated that the computer 902 can be used in connection with implementing one or more of the systems or components shown and described in connection with FIG. 1 and other figures disclosed herein. As depicted, system 100 can include a data component 102, an analysis component 112, and a guide component 118.

Data component 102 can be configured to receive program schedule data 104 for a set of channels 106, which can include substantially any number, N, of individual channels $106_1$-$106_N$, which are hereinafter referred to, either individually or collectively, as channel(s) 106, with appropriate subscripts generally employed only when instructive or convenient to highlight various distinctions or to better impart the disclosed concepts. The program schedule data 104 can include a title 108 of a program broadcast on a channel 106 and a time 110 associated with the broadcast of the program. Typically, set of channels 106 will relate to television or cable channels, which is distinct from single-provider or even multiple provider on-demand services. For instance, issues associated with guides for live television differ from those associated with guides for on-demand services in which content is not broadcast according to a predetermined schedule.

Analysis component 112 can be configured to determine relevance rank 114 associated with the program. Determination of relevance rank 114 can be effectuated in a variety of ways, which is further detailed in connection with FIG. 5 and herein. In some implementations, relevance rank 114 can be determined based on input data 116, which is also further detailed with reference to FIG. 5 and herein.

Guide component 118 can be configured to select title 108 for inclusion in program guide 120 based on relevance rank 114. Guide component 118 can further determine a position within program guide 120 for title 108 based on relevance rank 114. It is underscored that guide component 118 can facilitate presentation of program guide 120 in a manner that is independent of channel 106 and time 110 associated with the broadcast. Such a presentation therefore differs from that for other guides and also solves or mitigates difficulties associated with other guides, which is further detailed in connection with FIGS. 2A-4, which can be referenced now in conjunction with FIG. 1.

Figure 2A:
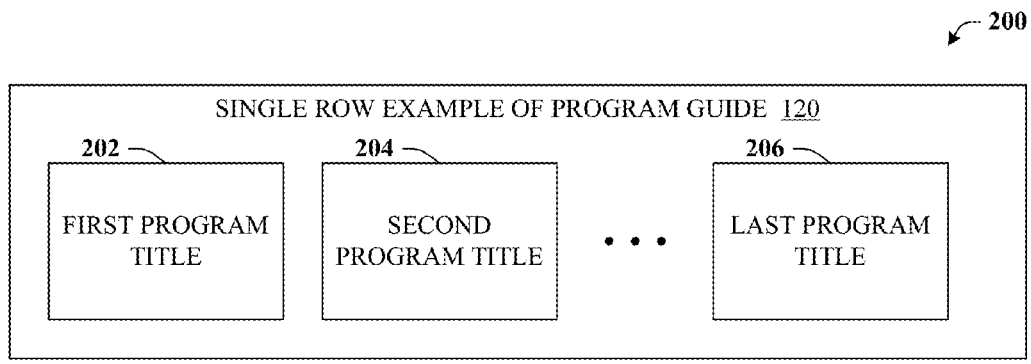
FIG. 2A illustrates a block diagram of a single-row example of the program guide in accordance with certain embodiments of this disclosure.
Figure 2B:
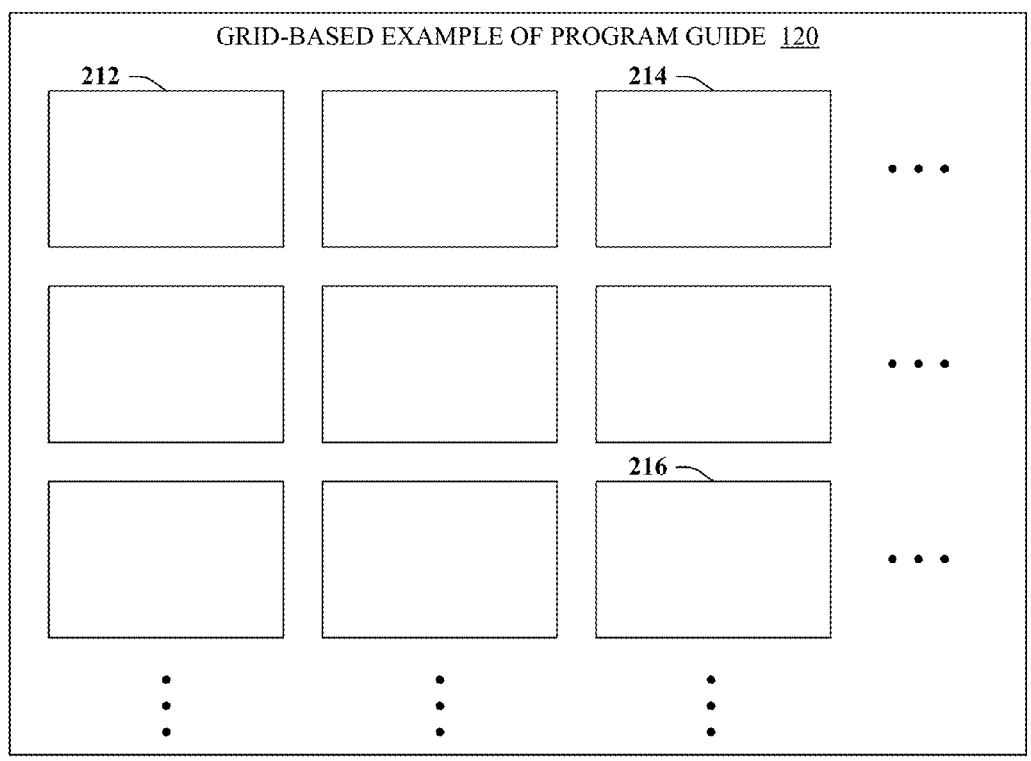
FIG. 2B illustrates a block diagram of a grid-based example of the program guide in accordance with certain embodiments of this disclosure.

Turning now to FIGS. 2A and 2B, illustrations 200 and 210 are provided. Illustration 200 depicts a single-row example of program guide 120. In this case, first program title 202 is listed initially, followed by second program title 204 and so on until last program title 206. It is understood that user interface elements (not shown) can be provided that enable scrolling or filtering in some form. Generally, the title 108 utilized to populate cell 202 is associated with a program that receives the highest relevance rank 114 from among all or a subset of the programs broadcast or scheduled to be broadcast by set of channels 106. The title 108 associated with the next highest relevance rank 114 can be provided to cell 204, and so on until the title 108 with the lowest relevance rank 114 or the lowest relevance rank 114 that satisfies a particular threshold (e.g., a numeric rank threshold or a title quantity limit threshold) is included in cell 206.

Illustration 210 of FIG. 2B depicts a grid-based example of program guide 120. Illustration 210 can be substantially similar to illustration 200, typically with title 108 associated with the program with the highest relevance rank 114 presented at cell 212, that with a lower relevance rank 114 presented at cell 214, and that with the lowest relevance rank 114 (among the visible cells) presented at cell 216.

It is appreciated and understood that for illustrations 200 and 210 and others provided herein, guide 120 can be presented without reliance on a channel dimension or axis or a time dimension or axis. As such, titles 108 from different source channels can be in the same row (or other formatted dimension) and titles with different broadcast start times can be in the same column (or other formatted dimension). For example, cell 212 can be populated with a first title 108 that starts at the same time as a second title 108 displayed at cell 214, even though cell 212 and cell 214 exist in different columns, which is generally a time axis for other guides, and therefore infeasible for other guides. The first title 108 and the second title 108 can also be sourced from different channels, even though both are in the same row, which is generally a channel axis for other guides. Furthermore, because presentation of program guide 120 does not depend on a time axis format, a size of any of the various cells 202-216 is not directly tied to a running length of an associated program and/or the time remaining of an associated program.

Figure 3:
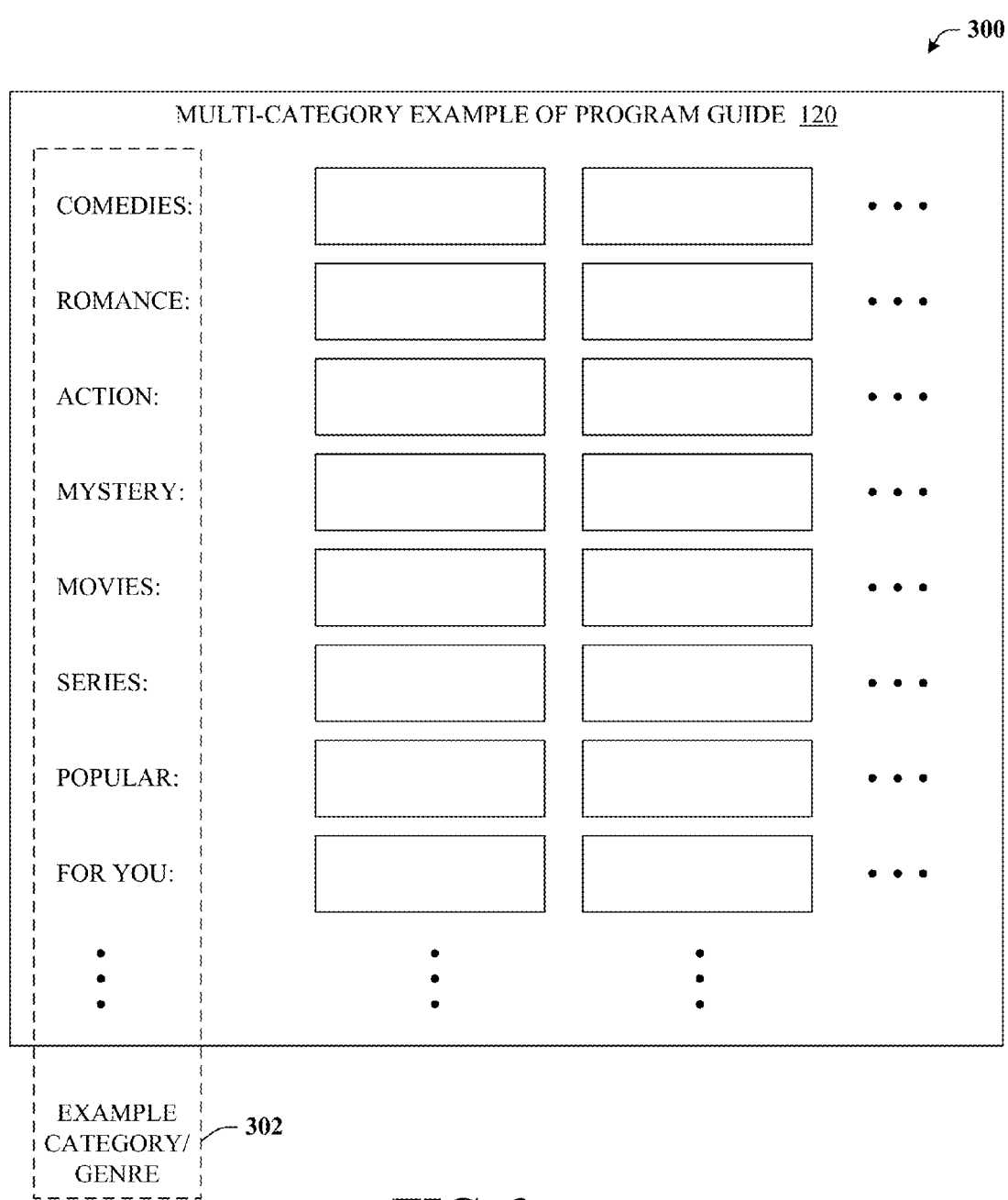
FIG. 3 illustrates a block diagram of a multi-category example of the program guide in accordance with certain embodiments of this disclosure.

With reference now to FIG. 3, illustration 300 is presented. Illustration 300 provides a multi-category example of program guide 120. In this example, various categories and/or genres 302 can exist, for example, as an addition filter. For instance, for the "comedies" genre 302, titles that appear in cells in the same row can be characterized according to that particular genre 302. Titles 108 of programs with higher relevance ranks 114 again can be positioned before those of with lower relevance ranks 114, but typically, titles 108 only compete within a respective category. For instance, the first cell of the "romance" genre 302 might be populated with a title 108 with a lower relevance rank 114 than the last cell associated with the "comedies" genre 302.

Figure 4:
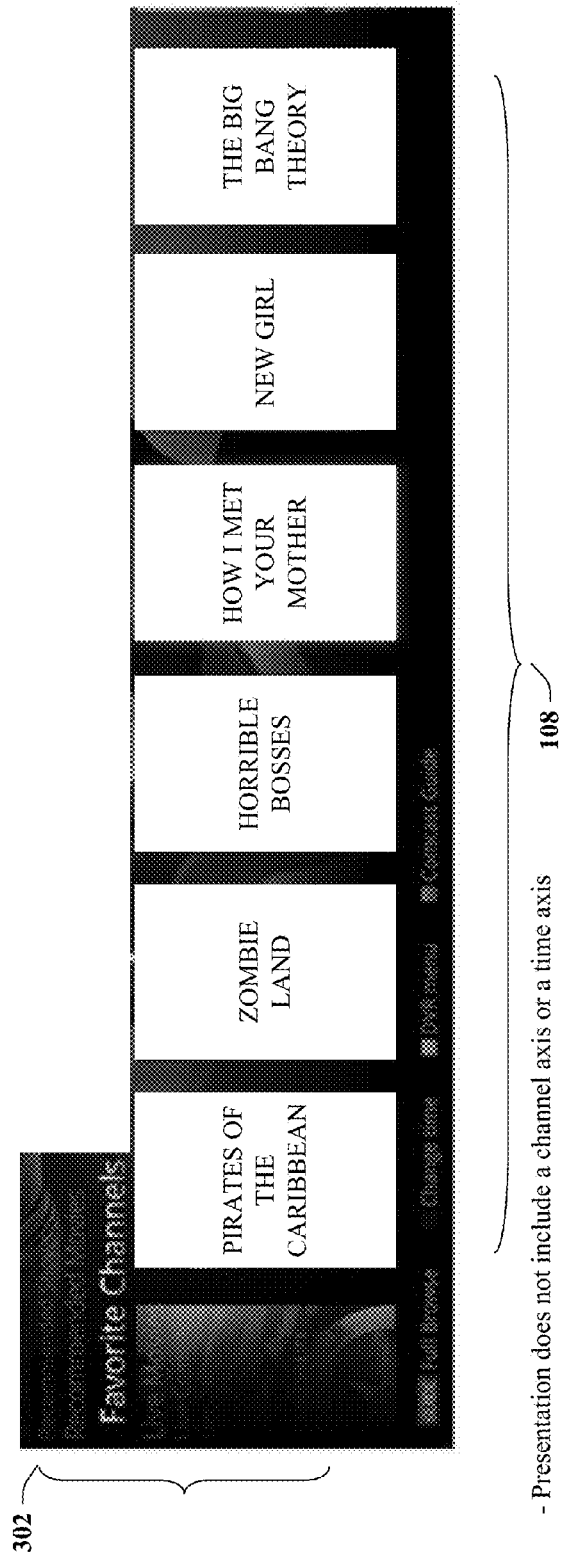
FIG. 4 illustrates a graphic illustration depicting an example mock up of an example the program guide in accordance with certain embodiments of this disclosure.

FIG. 4 provides graphic illustration 400. Graphic illustration 400 depicts an example mock up of an example program guide 120. As illustrated, various program titles 108 can be listed according to an associated relevance rank 114. Further, titles 108 that are listed can be filtered based on a selected category/genre 302. As with other examples included herein, presentation of titles 108 is not reliant on a source channel or a time dimension. Hence, titles 108 from different source channels 106 can be in the same row and sizes of cells and/or title icons can be independent of running time of the associated program.

Figure 5:
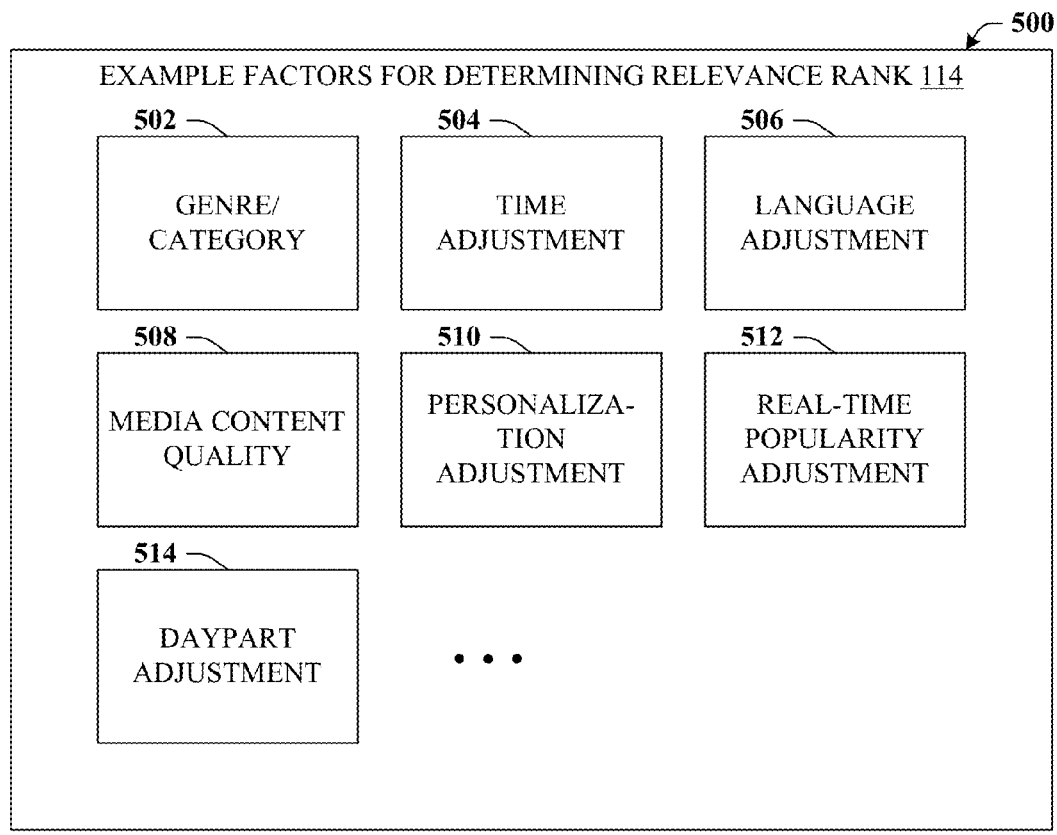
FIG. 5 illustrates a block diagram of various example factors for determining the relevance rank in accordance with certain embodiments of this disclosure.
Figure 6:
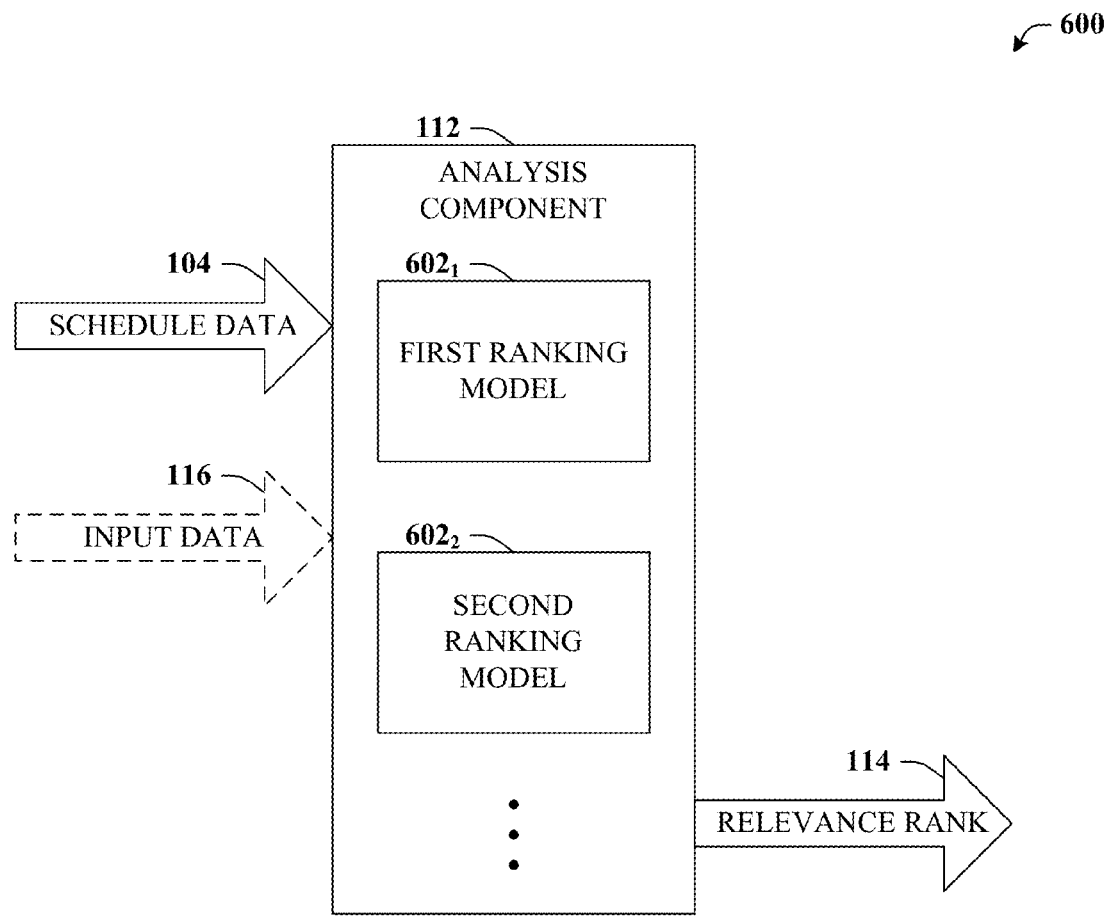
FIG. 6 illustrates a block diagram of an example system providing additional features or detail in connection with the analysis component in accordance with certain embodiments of this disclosure.

Turning now to FIGS. 5 and 6, diagram 500 and system 600 are illustrated. Diagram 500 provides various example factors for determining relevance rank 114. For example, analysis component 112 can employ any combination of these example factors 502-514 as well as other suitable factors in determining relevance rank 114. It is understood that example factors 502-514 are not to be construed as limiting, but rather as concrete examples. In some implementations at least a portion of the data that analysis component 112 uses to determine relevance rank 114 can be received as input data 116, which might include a portion of data related to example factors 502-514.

System 600, which can be referenced in conjunction with FIGS. 1 and 5 provides additional features or detail in connection with analysis component 112. Analysis component 112 can determine relevance rank 114 based on schedule data 104 as well as input data 116 (that can relate to factors 502-514). Relevance rank 114 can be determined based on a variety of statistical techniques including, e.g., machine learning, clustering, regression, and so on, and can include multiple ranking models, any or all of which can be utilized to determine relevance rank 114. Typically, the multiple ranking models (e.g., first ranking model $602_1$, second ranking model $602_2, \ldots$) can be applied to a particular type or set of data that is specific to or supported by the associated model, which is further detailed herein.

Still referring to FIG. 5, genre and/or category 502 can be a factor employed by analysis component 112 in determining relevance rank 114. Genre typically relates to a classification of the subject matter of the program such as comedy, mystery, news, etc., whereas category generally relates to a type of product associated with the program, for instance, series, feature film, etc. Category can also refer to non-genre classifications that would be relevant to a content consumer, for instance, Oscar winners, new releases, trending right now, etc. Genre/category 502 can be relevant by itself or in connection with other factors 504-514, examples of which are provided herein.

In some embodiments, analysis component 112 can determine relevance rank 114 based on time adjustment 504, which relates to an amount of time before the program begins or an amount of time remaining or a percentage of time remaining. Time adjustment 504 can be determined from a comparison of a current time to a start time or a remaining time for the program. It is understood that programs that are scheduled to start now or soon are typically more appealing than programs that are well underway or ending.

However, certain exceptions exist. For example, programs relating to news, weather, or the like often still have high appeal even when the broadcast is nearly over. In fact, certain programs might have even higher appeal near the end of the broadcast than the beginning, such as sporting events (e.g., with a close score or in overtime) or game shows (e.g., Jeopardy, American Idol, etc.). Hence, in some embodiments, analysis component 112 can employ time adjustment 504 as a function of genre/category 502, wherein time adjustment 504 can influence relevance rank 114 more significantly for a first genre/category 502 than for a second genre/category 502. For instance a relevance rank 114 for a feature film program might be dramatically penalized if the program is well underway, whereas a relevance rank 114 for a news program might suffer little or no penalty if well underway.

Such can be accomplished by way of one or more ranking models 602 associated with analysis component 112. As one example, an n-length series of value pairs, e.g., 10:3, 12:5, 13:9, 15:25, 40:50, 90:10, can be provided. The first value can represent a percentage of completion of the associated program and the second value can represent a weight associated with a penalty (or bonus) to apply to an associated relevance rank 114. Between the n-length value pairs, either a straight line can be applied or a smoothed line approximating intermediate values. It is appreciated that only 1 value pair is needed, as others can be inferred including a starting point of 0:0 (representing the start of the program, for which no time adjustment weight is applied), and an ending point 100:100. In the foregoing manner, time adjustment factor 504 can heavily penalize, e.g., movies that are well underway without penalizing heavily (or at all) a sports program that is well underway. Further, various different profiles for programs of a particular genre/category 502 can be predetermined and can be updated periodically. In particular, a different profile can be utilized based on a program running time (e.g., 30 minutes, 60 minutes, 120 minutes, etc.)

Language adjustment 506 can be employed by analysis component 112 to determine or weight relevance rank 114. Language adjustment 506 can be determined by examining a device associated with a content consumer or application settings associated with the device (e.g., application language settings). Language adjustment 506 can also be determined based on Internet protocol geolocation techniques for the device. Based on these or other techniques, penalties or bonuses can be applied to a relevance rank 114 of a given program. For instance, a content consumer in the United States that has Spanish selected as an application setting is also likely to understand some English. As such, Spanish language programs can be boosted by, say, 50%, and English language programs can be penalized, say, 50%. In contrast, a content consumer in the United States that has English selected in a language setting has a much lower likelihood of knowing Spanish. Thus, English language programs can be boosted, say, 80% and Spanish language programs can be penalized, say, 95%. Such has an effect of pushing Spanish language content to the 'end of the shelf,' and can be utilized to enable rich inferences about language in subtle ways, e.g., in different countries and/or locales. For example, multiple languages spoken in a single country can be supported, and such can be based on relative percentages. Further, updates can be provided in real time.

In some embodiments, analysis component 112 can determine relevance rank 114 based on media content quality 508 (e.g., high-definition (HD), standard definition (SD), etc.), which can be determined based on a history associated with a device of a content consumer or other features associated with the device or features associated with a network or carrier (e.g., bandwidth, etc.). As one example, if a history reveals that a content consumer has viewed most or all content in SD, then SD programs might receive the same or slightly higher bias than HD programs in terms of the media content quality 508 factor. However, if the content consumer has viewed many programs in HD in the past, then HD programs can be more heavily weighted than SD programs. As with most other factors detailed herein, updates to media content quality 508 can be made in real time.

In some embodiments, analysis component 112 can determine relevance rank 114 based on personalization adjustment 510. Personalization adjustment 510 can be based on input data 116 received from a device associated with a content consumer such as program or other ratings, a view history, preferences or settings or the like. Moreover, personalization adjustment 510 can be determined by application of a ranking model 602, which can be different than other ranking models 602 employed in connection with other types of input data 116. It is appreciated that ranking models 602 associated with other types of media content (e.g., on-demand content) can differ from those that are directed to live television content. Accordingly, in some embodiments, ranking model 602 can be expressly trained for programs associated with live television. By employing techniques associated with personalization adjustment 510, yet another affinity factor can be expressed in connection with relevance rank 114. Programs with similar content can be promoted and programs with dissimilar content can be demoted in terms of relevance rank 114.

In some embodiments, analysis component 112 can determine relevance rank 114 based on live and/or real time broadcast popularity adjustment 512. For example, adjustment 512 can be determined based on data associated with a program that is currently being broadcast by one of the channels 106. Such can be based on audience viewer statistics, ratings, or the like. For example, viewer statistics can be collected in real time and such data (e.g., input data 116) can be employed to weight relevance rank 114 for programs that are showing a greater audience in real time.

By way of example, such data can be gathered in a variety of ways. For instance, in certain web-based mediums, clicks on "view" links can be aggregated from one or more providers. In other embodiments and/or platforms, for example, when consumer systems include specific control devices, other techniques can be utilized. For example, such control devices can relate to either 1-way or 2-way paired devices. A 1-way example can be an infrared blaster one-directional control of, e.g., a cable, satellite, or over-the-air (OTA) tuning device(s), typically content provider device(s). A 2-way example can be between a web-based platform and/or device and the cable, satellite, or OTA tuning devices.

It is understood that if 2-way pairing is implemented, then very precise audience statistics can be collected, e.g., comprehensive statistics down to the second throughout the content consumer's view session. Using such real time data can allow timely and relevant updates, including refinements of predictive models with actual statistics as well as training of predictive or other models 602. Such can be utilized to improve ranking models 602 as well as enable effective ranking of certain programs that are "one-off" in nature. An effect of such ranking is that programs that have a large audience or rapid increase in viewing can be identified, and can be employed to boost a relevance ranking 114 associated with such programs for all or a portion of users of program guide 120. As another example, content identification techniques, such as audio, video or closed-captioning/text fingerprinting can be utilized to identify a program and obtain audience viewership. With such a technique, even 1-way pairing can provide quite precise viewer statistics that can be utilized as a factor in relevance rank 114.

In some embodiments, analysis component 112 can be configured to determine relevance rank 114 based on daypart adjustment 514. Daypart adjustment 514 can be determined based on a calendar time associated with a broadcast of an associated program (e.g., a day of the week and/or a time of the day, such as Monday at 9:00 am, Friday at 8:00 pm, etc.). There exists a strong correlation between a type of program and when content consumers tend to watch that program, possibly due to the typical free time or relaxation time associated with a particular demographic or other factors.

Yet another ranking model 602 can be employed to determine or predict a popularity associated with a particular program. Factors that can affect daypart adjustment 514 can include, e.g., a specific program, a specific channel, a day of broadcast, a time of broadcast, a genre/category 502, an audience share associated with that station on that day at that time one week ago, two weeks ago, three weeks ago, etc., as well as an indication if the program is live, a rerun, a re-airing of a current season's episode, a re-airing of a past season's episode, a premiere or the like. Moreover, such determinations can span time zones, so that an associated ranking model 602 might be more likely to determine that a program starting in one time zone will be quite popular if the same program was determined to be popular in an earlier time zone.

It is appreciated that some or all of the techniques described herein or otherwise utilized in connection with the disclosed subject matter can be applied to or tailored for specific locales such as countries, states, provinces, regions, and even particular neighborhoods. It is further underscored that ranking models 602 can predict or discover popularity, and both types of modeling can be used contemporaneously on different data sets or even on the same data set. For example, a first ranking model $602_1$ can be utilized to model popularity based on real time popularity adjustment 512, and a second ranking model $602_2$ can be used to predict popularity based on daypart adjustment 514. Both ranking models 602 (as well as others) can be employed in combination to determine relevance rank 114 for a particular program, possibly in connection with a particular content consumer.

Furthermore, user profiles can be constructed such that multiple users of a particular device can maintain separate profiles or an individual user can maintain multiple profiles. Just as different users/content consumers are likely to be interested in different types of programs, a given user/content consumer might be interested in very different programs based on different situations. For example, when a parent is searching for programs to watch with a young child, such is likely to be very different than the type of content the parent is interested in otherwise. Accordingly, the parent can select a first profile in one case and a second profile in the other case. Because the profile is changed, the associated relevance rank 114 for all programs will likely be different. Thus, the program titles 108 that are selected to populate program guide 120 will likely be different as well. Moreover user profiles and switching between user profiles is not explicitly required and could be implicitly detected based on observed behavior. For instance, consider a household with two varying viewing styles, one of which includes more adult-oriented content while the other includes more child-oriented content. In this case it is possible to detect in real-time based on immediately prior viewings which of the two viewing styles is being employed and thus the relevance rank 114 can be adjusted accordingly to favor the type of content associated with that viewing style in real-time.

Example Methods for Creating a Program Guide

Figure 7:
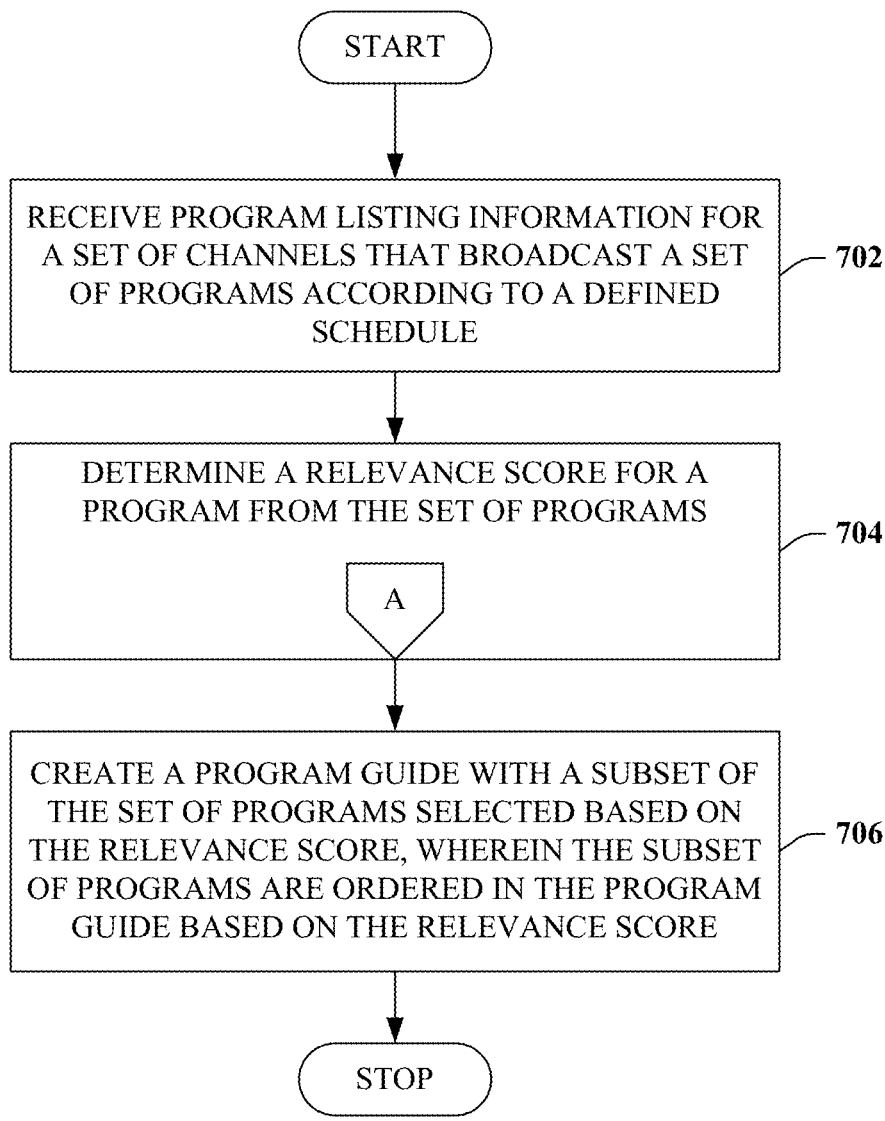
FIG. 7 illustrates an example methodology that can provide for an enhanced program guide that can be presented independent of a channel axis and a time axis in accordance with certain embodiments of this disclosure.
Figure 8:
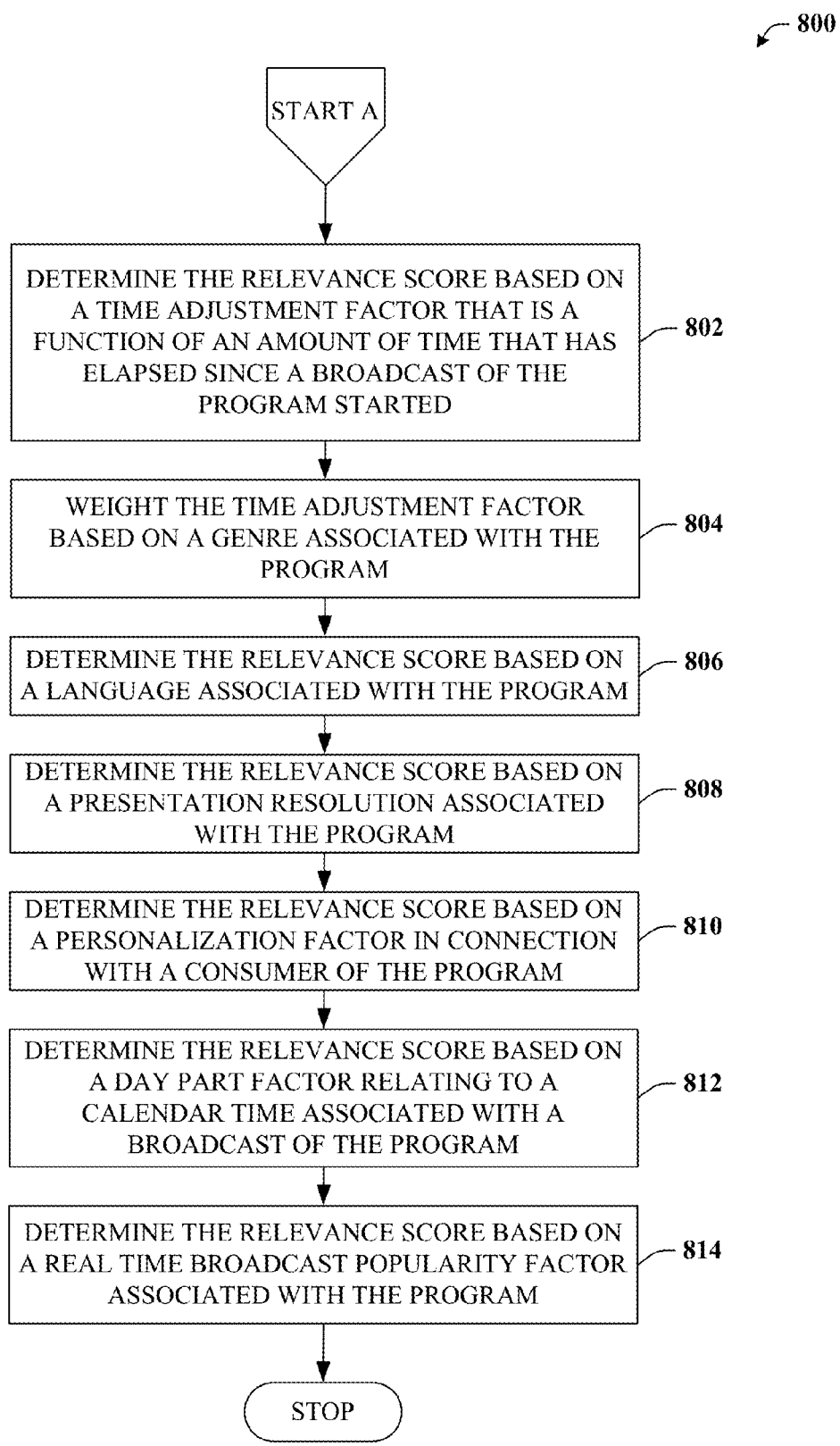
FIG. 8 illustrates an example methodology that can provide for additional features or aspects in connection with the enhanced program guide in accordance with certain embodiments of this disclosure.

FIGS. 7 and 8 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

FIG. 7 illustrates exemplary method 700. Method 700 can provide for an enhanced program guide that can be presented independent of a channel axis and a time axis. For example, at reference numeral 702, program listing information can be received for instance by a data component. The program listing information can relate to a set of channels that broadcast a set of programs according to a defined schedule. For example, the set of channels can be cable or satellite channels or OTA channels that have a set schedule relating to programs that are broadcast as well as the time those programs are broadcast.

At reference numeral 704, a relevance score can be determined (e.g., by an analysis component) for a program from the set of programs. The relevance score can be determined in a variety of ways that can depend on implementation or available data sets, which is further detailed with reference to FIG. 8.

At reference numeral 706, a program guide can be created with a subset of the set of programs received at reference numeral 702. The set of programs can be selected for inclusion in the program guide based on the relevance score. The subset of programs (that are selected for inclusion in the program guide) can be ordered within the guide based on the relevance score. For instance, programs with a higher relevance score will typically appear higher in an order list than programs with lower relevance scores. Presentation of the program guide can be in a manner that does not include a channel axis, so programs from different channels can appear on the same row, etc.; or a time axis, so programs with different start times can appear on the same column, etc. and the size of a cell that includes a program title can be independent of a running time of the program.

Turning now to FIG. 8, exemplary method 800 is depicted. Method 800 can provide for additional features or aspects in connection with the enhanced program guide. Method 800 can begin at the start of insert A. At reference numeral 802, the relevance score determined at reference numeral 704 can be determined based on a time adjustment factor. The time adjustment factor can be a function of an amount of time that has elapsed since a broadcast of the program started. Additionally or alternatively, the time adjustment factor can be a function of an amount of time until a broadcast of the program begins. For example, programs that are well underway can have an associated relevance score severely penalized as can programs that are not due to begin for some time.

However, such need not always be the case. For instance, at reference numeral 804, the time adjustment factor can be weighted based on a genre associated with the program. Because some genres or other categories of programs do not necessarily lose appeal even when nearly over (e.g., news, weather, sports, etc.), such programs can be appropriately weighted in terms of the effect the time adjustment factor has on the relevance score.

At reference numeral 806, the relevance score can be based on a language associated with the program. Typically, language factors can be applied in connection with device or application settings. For example, if a device or application indicates a preference for a particular language, then programs that are broadcast in that particular language can generally be promoted, whereas programs broadcast in other languages can generally be demoted to varying degrees.

At reference numeral 808, the relevance score can be determined based on a presentation resolution associated with the program. For example, this presentation resolution factor can affect the relevance score as a function of whether the program is presented in high definition, standard definition, etc.

At reference numeral 810, the relevance score can be determined based on a personalization factor in connection with a consumer of the program content. The personalization factor can relate to settings, preferences, histories, ratings, watches, previews, rentals, purchases, and so forth with respect to the consumer or a device associated with the consumer. Such data can be employed in connection with one or more ranking models to determine or infer likes or interests of the consumer as well as dislikes, and such can be used to influence the relevance score appropriately.

At reference numeral 812, the relevance score can be determined based on a daypart factor. The daypart factor can relate to a calendar time associated with a broadcast of the program. Such can be used in connection with predictive ranking models and can be utilized to adjust the relevance score.

At reference numeral 814, the relevance score can be based on a real time broadcast popularity factor associated with the program. For example, if a program currently has a very wide viewership, or is rapidly trending for some reason (e.g., viewership suddenly increases), then such can be utilized to influence the relevance score. Likewise, a low viewership or a trend of viewers turning off the program or switching to other programs can also affect the relevance score, typically in a negative way. Method 800 ends.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 9:
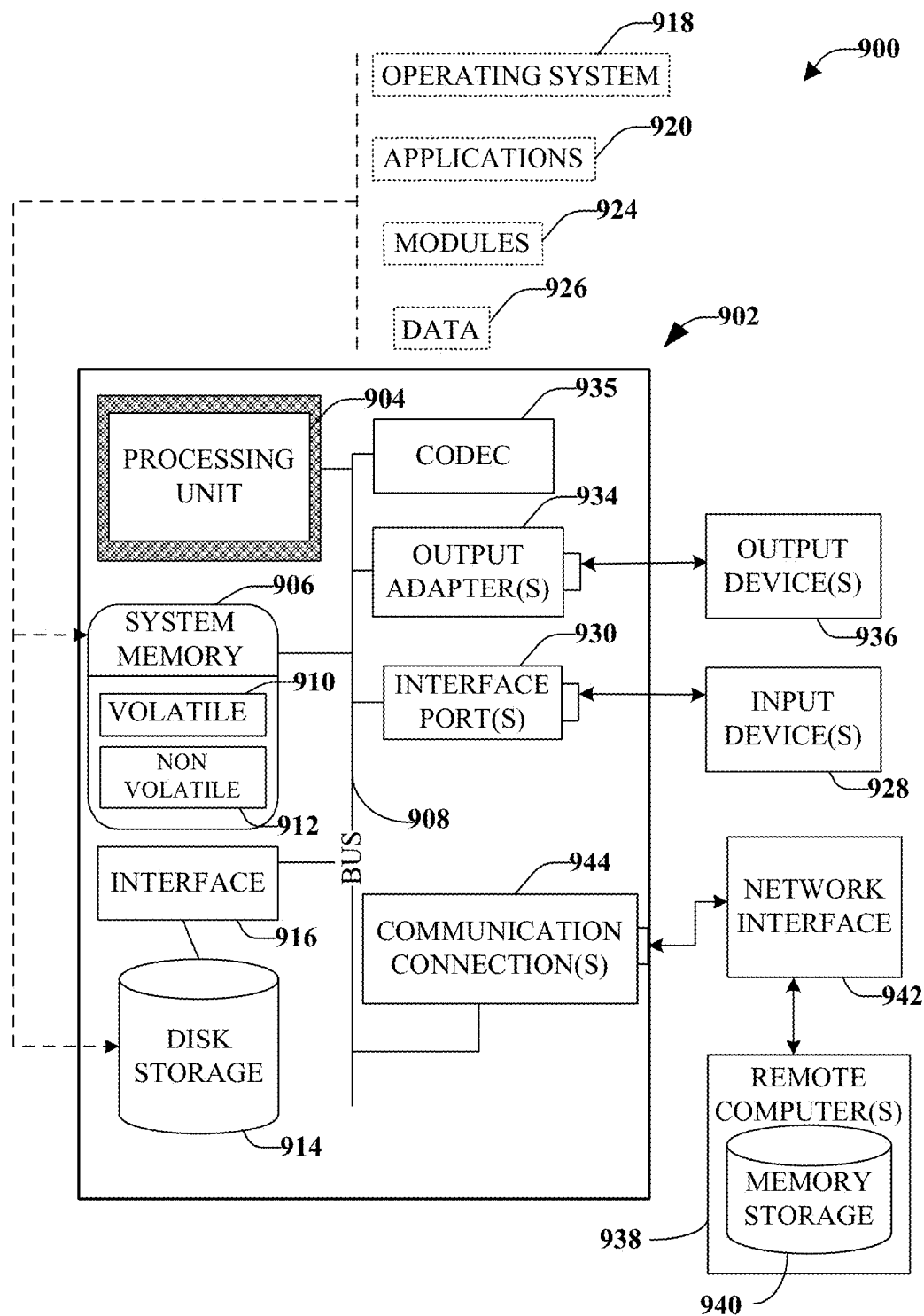
FIG. 9 illustrates an example schematic block diagram for a computing environment in accordance with certain embodiments of this disclosure.

With reference to FIG. 9, a suitable environment 900 for implementing various aspects of the claimed subject matter includes a computer 902. The computer 902 includes a processing unit 904, a system memory 906, a codec 935, and a system bus 908. The system bus 908 couples system components including, but not limited to, the system memory 906 to the processing unit 904. The processing unit 904 can be any of various available processors. Dual microprocessors and other multiprocessor architectures also can be employed as the processing unit 904.

The system bus 908 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI) or others now in existence or later developed.

The system memory 906 includes volatile memory 910 and non-volatile memory 912. The basic input/output system (BIOS), containing the basic routines to transfer information between elements within the computer 902, such as during start-up, is stored in non-volatile memory 912. In addition, according to present innovations, codec 935 may include at least one of an encoder or decoder, wherein the at least one of an encoder or decoder may consist of hardware, software, or a combination of hardware and software. Although, codec 935 is depicted as a separate component, codec 935 may be contained within non-volatile memory 912 or included in other components detailed herein such as compilation component 126. By way of illustration, and not limitation, non-volatile memory 912 can include read only memory (ROM), programmable ROM (PROM), electrically programmable ROM (EPROM), electrically erasable programmable ROM (EEPROM), or flash memory. Volatile memory 910 includes random access memory (RAM), which acts as external cache memory. According to present aspects, the volatile memory may store the write operation retry logic (not shown in FIG. 9) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM), resistive RAM (RRAM), or others now in existence or later developed.

Computer 902 may also include removable/non-removable, volatile/non-volatile computer storage medium. FIG. 9 illustrates, for example, disk storage 914. Disk storage 914 includes, but is not limited to, devices like a magnetic disk drive, solid state disk (SSD) floppy disk drive, tape drive, flash memory card, or memory stick. In addition, disk storage 914 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 914 to the system bus 908, a removable or non-removable interface is typically used, such as interface 916. It is appreciated that storage devices 914 can store information related to a user. Such information might be stored at or provided to a server or to an application running on a user device. In one embodiment, the user can be notified (e.g., by way of output device(s) 936) of the types of information that are stored to disk storage 914 and/or transmitted to the server or application. The user can be provided the opportunity to opt-in or opt-out of having such information collected and/or shared with the server or application (e.g., by way of input from input device(s) 928).

It is to be appreciated that FIG. 9 describes software that acts as an intermediary between users and the basic computer resources described in the suitable operating environment 900. Such software includes an operating system 918. Operating system 918, which can be stored on disk storage 914, acts to control and allocate resources of the computer system 902. Applications 920 take advantage of the management of resources by operating system 918 through program modules 924, and program data 926, such as the boot/shutdown transaction table and the like, stored either in system memory 906 or on disk storage 914. It is to be appreciated that the claimed subject matter can be implemented with various operating systems or combinations of operating systems.

A user enters commands or information into the computer 902 through input device(s) 928. Input devices 928 include, but are not limited to, a pointing device such as a mouse, stylus, touch pad, keyboard, microphone, joystick, game pad, satellite dish, scanner, TV tuner card, digital camera, digital video camera, web camera, and the like. These and other input devices connect to the processing unit 904 through the system bus 908 via interface port(s) 930. Interface port(s) 930 include, for example, a serial port, a parallel port, a game port, and a universal serial bus (USB). Output device(s) 936 use some of the same type of ports as input device(s) 928. Thus, for example, a USB port may be used to provide input to computer 902 and to output information from computer 902 to an output device 936. Output adapter 934 is provided to illustrate that there are some output devices 936 like monitors, speakers, and printers, among other output devices 936, which require special adapters. The output adapters 934 include, by way of illustration and not limitation, video and sound cards that provide a means of connection between the output device 936 and the system bus 908. It should be noted that other devices and/or systems of devices provide both input and output capabilities such as remote computer(s) 938.

Computer 902 can operate in a networked environment using logical connections to one or more remote computers, such as remote computer(s) 938. The remote computer(s) 938 can be a personal computer, a server, a router, a network PC, a workstation, a microprocessor based appliance, a peer device, a smart phone, a tablet, or other network node, and typically includes many of the elements described relative to computer 902. For purposes of brevity, only a memory storage device 940 is illustrated with remote computer(s) 938. Remote computer(s) 938 is logically connected to computer 902 through a network interface 942 and then connected via communication connection(s) 944. Network interface 942 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 944 refers to the hardware/software employed to connect the network interface 942 to the bus 908. While communication connection 944 is shown for illustrative clarity inside computer 902, it can also be external to computer 902. The hardware/software necessary for connection to the network interface 942 includes, for exemplary purposes only, internal and external technologies such as, modems including regular telephone grade modems, cable modems and DSL modems, ISDN adapters, and wired and wireless Ethernet cards, hubs, and routers.

Figure 10:
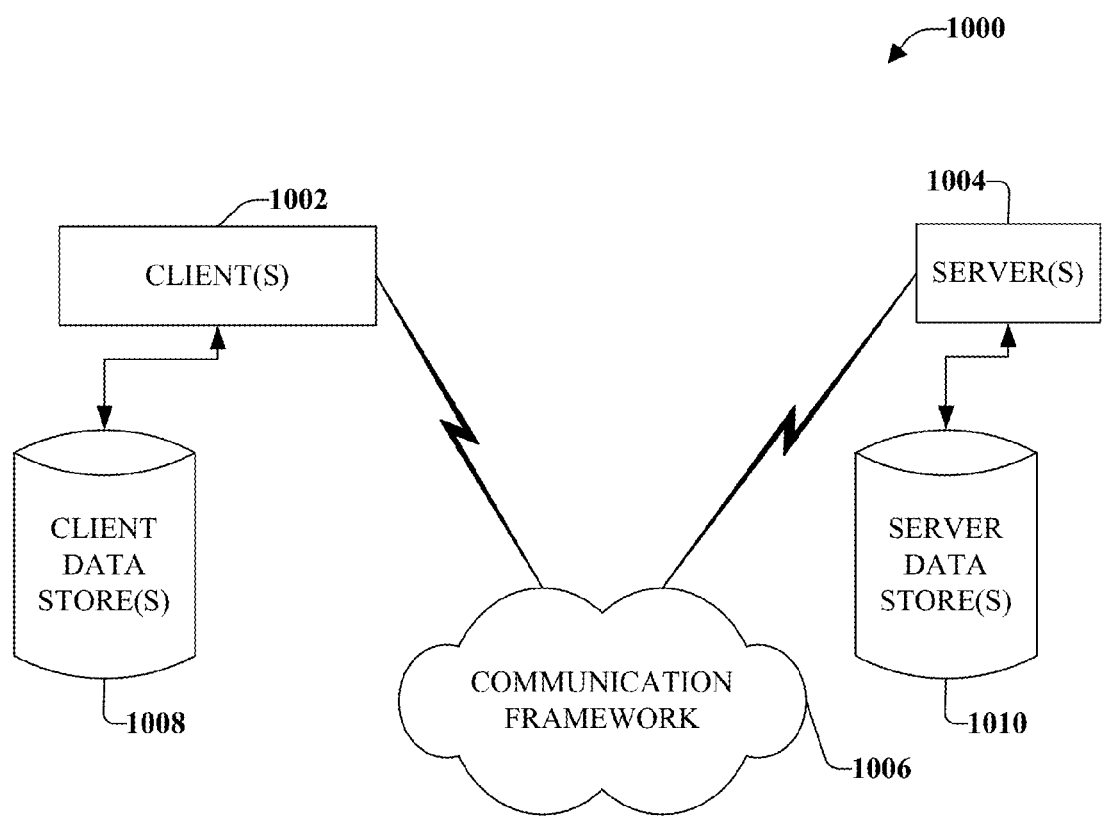
FIG. 10 illustrates an example block diagram of a computer operable to execute certain embodiments of this disclosure.

Referring now to FIG. 10, there is illustrated a schematic block diagram of a computing environment 1000 in accordance with this specification. The system 1000 includes one or more client(s) 1002 (e.g., laptops, smart phones, PDAs, media players, computers, portable electronic devices, tablets, and the like). The client(s) 1002 can be hardware and/or software (e.g., threads, processes, computing devices). The system 1000 also includes one or more server(s) 1004. The server(s) 1004 can also be hardware or hardware in combination with software (e.g., threads, processes, computing devices). The servers 1004 can house threads to perform transformations by employing aspects of this disclosure, for example. One possible communication between a client 1002 and a server 1004 can be in the form of a data packet transmitted between two or more computer processes wherein the data packet may include video data. The data packet can include a cookie and/or associated contextual information, for example. The system 1000 includes a communication framework 1006 (e.g., a global communication network such as the Internet, or mobile network(s)) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one embodiment, a client 1002 can transfer an encoded file, in accordance with the disclosed subject matter, to server 1004. Server 1004 can store the file, decode the file, or transmit the file to another client 1002. It is to be appreciated, that a client 1002 can also transfer uncompressed file to a server 1004 and server 1004 can compress the file in accordance with the disclosed subject matter. Likewise, server 1004 can encode video information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A system for media guidance, comprising:
a memory that stores computer executable components; and
a processor that executes the following computer executable components stored in the memory to:
receive program schedule data for a set of channels, wherein the program schedule data includes a title of a program broadcast on a channel from the set of channels and a time associated with the broadcast of the program;
determine a relevance rank based on a live broadcast popularity adjustment that is determined based on data associated with the program, wherein the relevance rank is determined by receiving input data from a user device, selecting a ranking model based on a content type associated with the input data received from the user device, and applying the selected ranking model to the input data to generate the relevance rank that is based on the live broadcast popularity adjustment;
determine a time adjustment value based on the time remaining in the broadcast of the program and a penalty weight value based on the received input data from the user device, wherein the penalty weight value is applied to the relevance rank to generate a weighted relevance rank;
select the title for inclusion in a program guide based on the weighted relevance rank and the time adjustment value; and
determine a position within the program guide for the title based on the time adjustment value and the weighted relevance rank, thereby facilitating presentation of the program guide in manner that is independent of a channel axis associated with the channel and a time axis associated with the time of the broadcast.

2. The system of claim 1, wherein the processor determines the relevance rank based on a time adjustment determined from a comparison of a current time to a start time or a remaining time for the program.

3. The system of claim 2, wherein the processor determines the time adjustment as a function of a genre or a category associated with the program, wherein the time adjustment influences the relevance rank more significantly for a first genre or category than for a second genre or category.

4. The system of claim 1, wherein the processor determines the relevance rank based on a language adjustment determined based on data associated with a user device.

5. The system of claim 1, wherein the processor determines the relevance rank based on a media content quality adjustment determined based on data associated with a user device.

6. The system of claim 1, wherein the processor determines the relevance rank based on a personalization adjustment determined based on data associated with a user device or a user, and a ranking model.

7. The system of claim 6, wherein the ranking model is trained for live television broadcasts.

8. The system of claim 1, wherein the processor determines the relevance rank based on a daypart adjustment determined based on a calendar time associated with the broadcast of the program.

9. A method for media guidance, comprising:
employing a computer-based processor to execute computer executable components stored within a memory to perform the following:
receiving program listing information for a set of channels that broadcast a set of programs according to a defined schedule;
determining a relevance score for a program from the set of programs based on a live broadcast popularity adjustment that is determined based on data associated with the program, wherein the relevance score is determined by receiving input data from a user device, selecting a ranking model based on a content type associated with the input data received from the user device, and applying the selected ranking model to the input data to generate the relevance score based on the live broadcast popularity adjustment;
determining a time adjustment value based on the time remaining in the broadcast of the program and a penalty weight value based on the received input data from the user device, wherein the penalty weight value is applied to the relevance rank to generate a weighted relevance rank; and
creating a program guide with a subset of the set of programs selected based on the time adjustment value and the weighted relevance score, wherein the subset of programs are ordered in the program guide based on the time adjustment value and the weighted relevance score and not indexed based on a channel identifier or a start time.

10. The method of claim 9, further comprising facilitating presentation of the program guide to a device comprising a display.

11. The method of claim 9, wherein the determining the relevance score includes determining the relevance score based on a time adjustment factor that is a function of an amount of time that has elapsed since a broadcast of the program started.

12. The method of claim 11, wherein the time adjustment factor influences the relevance score as a function of a genre or a category associated with the program.

13. The method of claim 9, wherein the determining the relevance score includes determining the relevance score based on a language associated with the program, or based on a presentation resolution associated with the program.

14. The method of claim 9, wherein the determining the relevance score includes determining the relevance score based on a personalization factor in connection with a consumer of the program, or based on a daypart factor relating to a calendar time associated with a broadcast of the program.

15. A system for media guidance, comprising:
a memory that stores computer executable components; and
a processor that executes the following computer executable components stored in the memory to:
receive program listing information for a set of channels that broadcast a set of programs according to a defined schedule;
determine a relevance score for a program from the set of programs based on a live broadcast popularity adjustment that is determined based on data associated with the program, wherein the relevance score is determined by receiving input data from a user device, selecting a ranking model based on a content type associated with the input data received from the user device, and applying the selected ranking model to the input data to generate the relevance score based on the live broadcast popularity adjustment;
determine a time adjustment value based on the time remaining in the broadcast of the program and a penalty weight value based on the received input data from the user device, wherein the penalty weight value is applied to the relevance rank to generate a weighted relevance rank; and
create a program guide with a subset of the set of programs selected based on the time adjustment value and the weighted relevance score, wherein the subset of programs are ordered in the program guide based on the time adjustment value and the weighted relevance score and independent of a time axis.

16. The system of claim 15, wherein the processor determines a real time broadcast popularity factor associated with the program in connection with the means for determining the relevance score.

17. The system of claim 15, wherein the processor determines a time adjustment factor associated with the program in connection with the means for determining the relevance score.

18. The system of claim 15, wherein the processor facilitates presentation of the program guide at a device including a display.

* * * * *